United States Patent
Hama

(10) Patent No.: US 6,934,481 B2
(45) Date of Patent: Aug. 23, 2005

(54) IMAGE FORMING APPARATUS AND IMAGE FORMING METHOD

(75) Inventor: Takashi Hama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 3 days.

(21) Appl. No.: 10/642,502

(22) Filed: Aug. 18, 2003

(65) Prior Publication Data

US 2004/0081476 A1 Apr. 29, 2004

(30) Foreign Application Priority Data

Aug. 20, 2002 (JP) ........................................ 2002-239125

(51) Int. Cl.⁷ .......................... G03G 15/00; H04N 1/40
(52) U.S. Cl. ............................ 399/49; 358/521; 399/72
(58) Field of Search .......................... 399/49, 72, 51, 399/60; 358/504, 518, 519, 521, 406; 382/167; 347/19, 188

(56) References Cited

U.S. PATENT DOCUMENTS

| | | | |
|---|---|---|---|
| 4,377,338 A | * | 3/1983 | Ernst .......................... 399/49 |
| 5,274,424 A | * | 12/1993 | Hattori et al. ................. 399/49 |
| 5,543,896 A | | 8/1996 | Mestha |
| 5,889,928 A | | 3/1999 | Nakamura et al. |
| 6,061,144 A | * | 5/2000 | Mamizuka ............... 358/519 X |

FOREIGN PATENT DOCUMENTS

| | | |
|---|---|---|
| EP | 0 763 783 A2 | 3/1997 |
| JP | 6-311365 A | 11/1994 |
| JP | 9-106120 A | 4/1997 |
| JP | 9-233340 A | 9/1997 |
| JP | 9-233341 A | 9/1997 |
| JP | 3325765 B2 | 9/2002 |
| JP | 3369039 B2 | 1/2003 |

* cited by examiner

Primary Examiner—Sophia S. Chen
(74) Attorney, Agent, or Firm—Sughrue Mion, PLLC

(57) ABSTRACT

A gradation patch image Ip used for determination of tone characteristics of an apparatus is progressively varied in the tone level thereof from the maximum tone level (level 255) to the minimum tone level (level 0). The gradation patch image is either a toner image continuously and consistently varied in the tone level thereof or a toner image having the tone levels varied stepwise at a smaller pitch than a width of a detection region of a patch sensor. In density detection of such a gradation patch image Ip, toner image densities at portions on either sides in the detection region of the patch sensor are canceled each other out by averaging and hence, only a toner image density substantially at the center of the detection region can be obtained.

14 Claims, 8 Drawing Sheets

IMAGE FORMING APPARATUS AND IMAGE FORMING METHOD

BACKGROUND OF THE INVENTION

1. Field of the Invention

The present invention relates to an image forming apparatus and image forming method wherein tone correction information is defined based on the density of a formed patch image.

2. Description of the Related Art

As an image forming apparatus such as a printer, a copier and a facsimile, there has been known, for example, an apparatus adapted for optimum color-tone recording by varying the light-emission time of a semiconductor laser based on an image signal sent from a host computer or a scanner. In this apparatus, RGB image signal are converted into CMYK color-tone data for each pixel representing toner colors. Subsequently, with reference to a look-up table stored in a non-volatile memory in the apparatus, the CMYK color-tone data items are corrected for the tone levels thereof based on gamma characteristics of the image forming apparatus (a relationship between a density value indicated by the input image information and a corresponding density value of an image output). An image is formed based on the corrected color-tone data. That is, the image forming apparatus takes the following procedure to form an image of excellent tone characteristics. This procedure includes the steps of: previously storing, in a memory, a look-up table for each of the CMYK colors as tone correction information representing corrected tone levels in correspondence to input tone levels; correcting the color-tone data for each of the CMYK colors using the look-up table; and forming an image based on the corrected color-tone data.

Unfortunately, the image forming apparatus of this type is susceptible to variations in its characteristics, or particularly the gamma characteristics thereof, in association with environmental changes such as of temperature and humidity or with aging. Accordingly, a serious degradation of the tone characteristics may result. Such a phenomenon is particularly noticeable in a non-magnetic mono-component development system. As a solution to this problem, there has hitherto been proposed a technique (hereinafter, referred to as "tone correction technique") for achieving the excellent tone characteristics by correcting the look-up table according to the characteristics variations. According to this technique, a plurality of test patch images individually having different tone levels are prepared, whereas an image density of each patch image of each tone level is detected. Then, the gamma characteristics of the image forming apparatus are determined from the detection results so that the look-up table may be corrected based on the characteristics thus determined.

In order that such a tone correction technique accomplishes more accurate correction of the look-up table, the greatest possible number of patch images of different tone levels are required for more accurate determination of the gamma characteristics of the apparatus. For more accurate detection of the density of a patch image of a tone level, on the other hand, the patch image must be formed in a sufficiently greater size than that of a detection spot of a density sensor for detecting the image density thereof. Thus, the increase in the number of tone levels to be represented by the patch images results in the increase in process time and toner consumption.

Conversely, if the patch image representing each tone level is decreased in the area thereof, the process time and the toner consumption will be decreased. This approach requires a density sensor of high resolution, which is capable of focusing on a smaller detection spot. Unfortunately, the density sensor having such a high resolution is expensive. Furthermore, the reduction of the detection spot size entails increased influences of minor image defects or noises on the detection results so that the detection accuracy is detrimentally lowered. In addition, more positive detection of the density of the small-sized patch image by means of the density sensor dictates the need for complicated control for high-precision alignment between the patch image and the density sensor. This also involves a cost increase.

In this connection, the conventional tone correction technique generally takes the following approach in order to acquire tone correction information while accomplishing the reduction of process time and toner consumption. Specifically, there are formed typical patch images representing several of the multiple tone levels (e.g., 256 tone levels), so that the several tone levels may be interpolated for estimation of the gamma characteristics. However, the more recent years have seen an increasing user demand for images of higher quality whereas the conventional technique does not necessarily afford the look-up table of sufficient accuracy. Consequently, the user demand cannot always be satisfied fully.

SUMMARY OF THE INVENTION

A main object of the invention is to provide an image forming apparatus and image forming method for stably forming a toner image of good quality based on a quick tone correction operation featuring high accuracy and consuming a reduced amount of toner.

For achieving the above object in accordance with the invention, an image having tone levels monotonously and continuously varied or varied stepwise at a smaller pitch than a width of a detection region of density detection means is formed as a gradation patch image. Hence, detection results given by the density detection means are averaged within the detection region, thus representing a toner image density substantially at a center of the detection region. The toner image density of a portion smaller than the resolution of the density detection means can be detected with high accuracy so that the gradation patch image for tone correction may be decreased in the area thereof. As a result, the toner consumption and the process time can be reduced.

Image formation may be performed based on an image signal tone-corrected using the resultant tone correction information whereby the toner image having good image quality is formed in a stable manner.

In this document, the term "toner image density" means not the image density (optical density) of the image fixed on the printing medium such as paper or the like, but the density of toner which configures the toner image temporarily borne on the image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
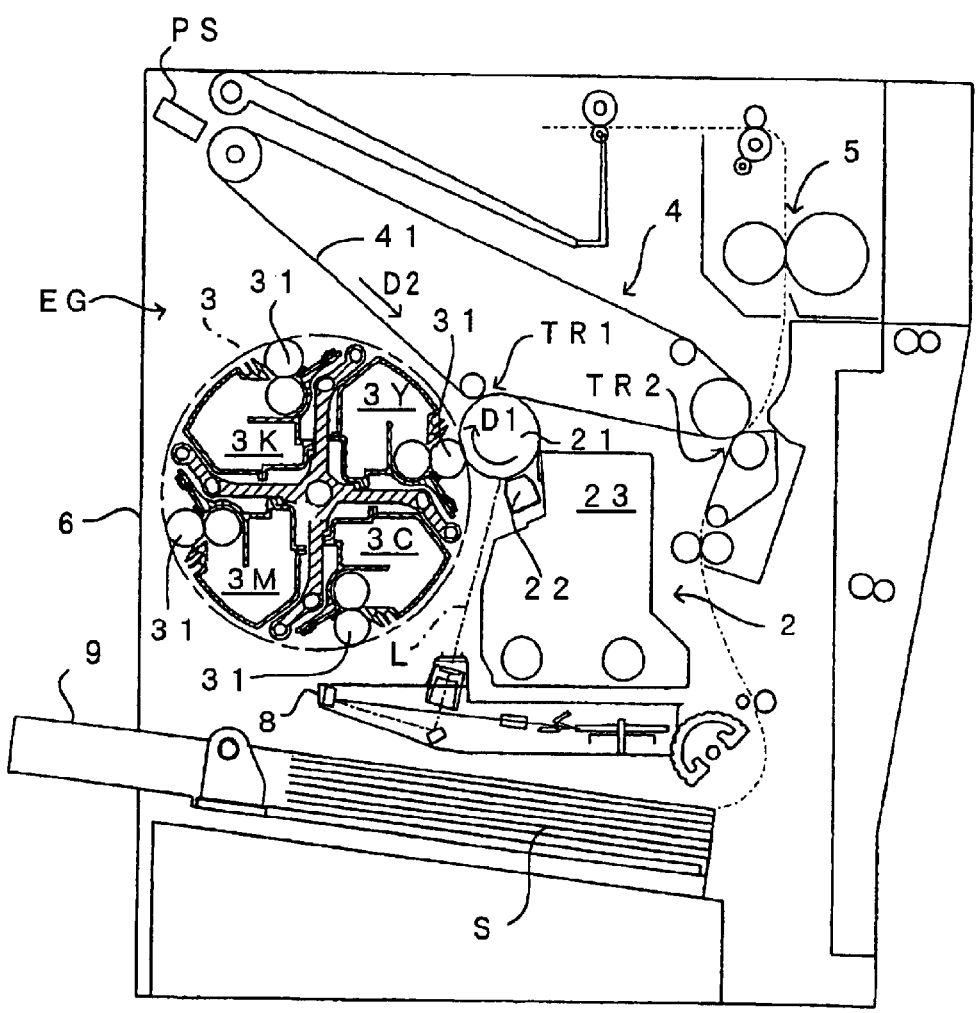
FIG. 1 is a diagram which shows an image forming apparatus according to one embodiment of the invention.
Figure 2:
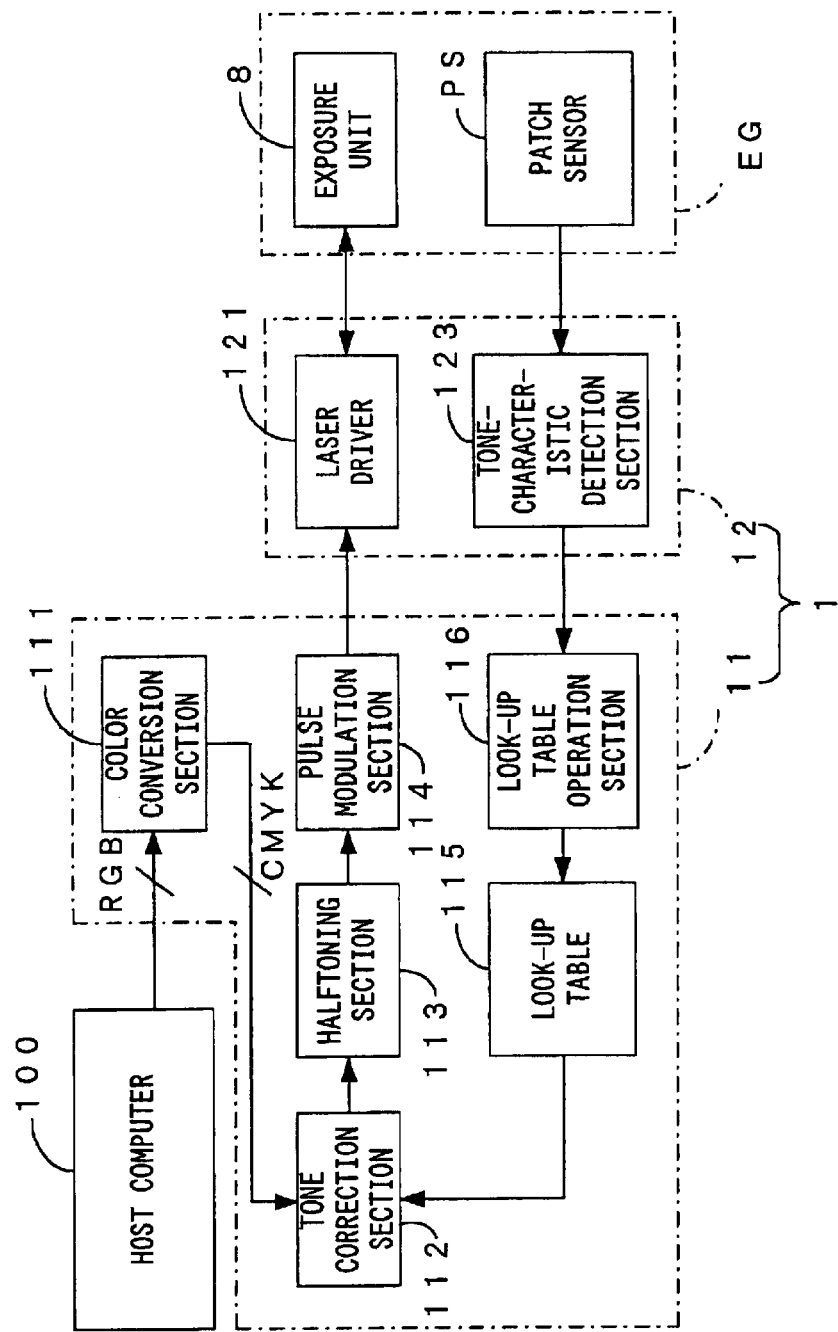
FIG. 2 is a block diagram which shows an electrical arrangement of the image forming apparatus of FIG. 1.

FIG. 1 is a diagram which shows an image forming apparatus according to one embodiment of the invention, whereas FIG. 2 is a block diagram which shows an electrical arrangement of the image forming apparatus of FIG. 1. The image forming apparatus is adapted to form a full-color image by superimposing toner images of four colors, including yellow (Y), magenta (M), cyan (C) and black (K), on each other or to form a monochromatic image using a black (K) toner alone. The image forming apparatus operates as follows. When an external apparatus such as a host computer 100 supplies an image signal to a main controller 11 of a control unit 1, an engine controller 12 responds to a direction from the main controller 11 so as to control portions of an engine EG whereby an image corresponding to the image signal is formed on a sheet S such as a copy sheet, transfer sheet or transparent sheet for OHP.

The engine EG includes 7 units: (a) a photosensitive unit 2; (b) a yellow developing unit (hereinafter, referred to as "Y developing unit") 3Y; (c) a magenta developing unit (hereinafter, referred to as "M developing unit") 3M; (d) a cyan developing unit (hereinafter, referred to as "C developing unit") 3C; (e) a black developing unit (hereinafter, referred to as "K developing unit") 3K; (f) an intermediate transfer unit 4; and (g) a fixing unit 5. The developing units 3Y, 3M, 3C and 3K each containing therein a non-magnetic mono-component toner of their respective color, are disposed in a rotary developing device 3.

These units are designed to be removably attachable to an apparatus body 6. As seen in FIG. 1, a photosensitive member 21 of the photosensitive unit 2 rotates in a direction D1 of an arrow shown in FIG. 1. In a state where all the units 2, 3Y, 3M, 3C, 3K, 4 and 5 are mounted to the apparatus body 6, a charger 22, a rotary developing device 3 and a cleaner 23 are disposed around the photosensitive member 21 along the rotation direction D1.

Of the 7 units 2, 3Y, 3M, 3C, 3K, 4 and 5, the photosensitive unit 2 houses the photosensitive member 21, the charger 22 and the cleaner 23, so that these components may unitarily be mounted to or removed from the apparatus body 6. An unillustrated charging bias generator applies a charging bias to the charger 22 which, in turn, uniformly charges an outer circumferential surface of the photosensitive member 21. In the photosensitive unit 2, the cleaner 23 is disposed on an upstream side from the charger 22 with respect to the rotation direction D1 of the photosensitive member 21, so as to scrape off a toner remaining on the outer circumferential surface of the photosensitive member 21 after primary image transfer. The surface of the photosensitive member 21 is cleaned in this manner.

An exposure unit 8 emits light beams L toward the outer surface of the photosensitive member 21 thus charged by the charger 22. As shown in FIG. 2, the exposure unit 8 is electrically connected with a laser driver 121 disposed in the engine controller 12. The exposure unit 8 is controlled based on a drive signal supplied from the laser driver 121, thereby applying the light beams L onto the photosensitive member 21. In the image forming apparatus, the main controller 11 decides a drive pulse width corresponding to per-pixel tone data based on the image signal supplied from the host computer 100 and then, supplies the resultant drive signal to the laser driver 121 of the engine controller 12. Thus, an electrostatic latent image corresponding to the image signal is formed on the photosensitive member 21.

The electrostatic latent image thus formed is developed into a toner image by means of the rotary developing device 3. The yellow developing unit 3Y, the cyan developing unit 3C, the magenta developing unit 3C and the black developing unit 3K are assembled in the rotary developing device 3 in a manner to rotate about an axis of the device. These developing units 3Y, 3M, 3C and 3K are moved to a plurality of predetermined positions to be positioned there, as selectively positioned at a developing position relative to the photosensitive member 21. FIG. 1 shows the yellow developing unit 3Y positioned at the developing position and allowing a developing roller 31 thereof to confront the photosensitive member 21. The other developing units 3M, 3C and 3K are individually positioned at the developing position just the same way as the developing unit 3Y, thereby allowing the respective developing rollers 31 thereof to confront the photosensitive member 21.

The developing unit positioned at the developing position permits a toner contained in a unit housing thereof to be delivered to the developing position as borne on the developing roller 31. When a predetermined developing bias is applied to the developing roller 31, the toner in the unit housing is transferred to the photosensitive member 21 via the developing roller 31, thereby visualizing the electrostatic latent image. In this manner, a toner image of a selected color is formed on the surface of the photosensitive member 21.

The toner image thus developed by the developing device 3 is primarily transferred onto an intermediate transfer belt 41 of the intermediate transfer unit 4 in a primary transfer region TR1. The intermediate transfer unit 4 includes the intermediate transfer belt 41 entrained about a plurality of plural rollers, and a driver (not shown) for driving the intermediate transfer belt 41 into rotation. In a case where a color image is transferred onto the sheet S, the individual toner images of the respective colors are superimposed on each other on the intermediate transfer belt 41 so as to establish the color image. In a case where a monochromatic image is transferred onto the sheet S, on the other hand, only the black toner image formed on the photosensitive member 21 is transferred to the intermediate transfer belt 41 so as to establish the monochromatic image thereon.

In the image forming apparatus according to the invention, a patch sensor PS for detecting a density of a patch image is disposed in opposing relation with one of the rollers about which the intermediate transfer bell 41 is entrained. In the embodiment, the intermediate transfer belt 41 functions as "an image carrier" of the invention.

The resultant image on the intermediate transfer belt 41 is secondarily transferred onto a sheet S in a predetermined secondary transfer region TR2, the sheet taken out from a cassette 9. The sheet S with the transferred toner image is introduced into the fixing unit 5 incorporating a heater (not shown), wherein the toner image is fixed to the sheet S under pressure with heating. The sheet S with the image formed thereon is transported to a discharge tray disposed at an upper portion of the apparatus body 6.

Next, an electrical arrangement and image forming operations (in normal print mode and tone correction mode) of the image forming apparatus of FIG. 1 are described with reference to FIG. 2. The main controller 11 comprises a CPU, a RAM, a ROM, a logic circuit and the like, including functional blocks such as a color conversion section 111, a tone correction section 112, a halftoning section 113, a pulse modulation section 114, a look-up table 115 and a look-up table operation section 116. The engine controller 12 also comprises a CPU, a RAM, a ROM, a logic circuit and the like. In addition to the aforementioned laser driver 121, the engine controller 12 further includes a tone-characteristic detection section 123 for detecting tone characteristics indicative of the gamma characteristics of the engine EG based on the detection results given by the patch sensor PS.

Receiving an image signal from the host computer 100, the color conversion section 111 of the main controller 11 converts RGB color-tone data into CMYK color-tone data, the RGB color-tone data representing tone levels of RGB components for each pixel in an image corresponding to the image signal whereas the CMYK color-tone data representing tone levels of CMYK components corresponding to the RGB components. In the color conversion section 111, the input RGB color-tone data comprise, for example, 8 bits per color component for each pixel (or representing 256 tone levels). Similarly, the output CMYK color-tone data also comprise 8 bits per color component for each pixel (or representing 256 tone levels). The color conversion section 111 outputs the CMYK color-tone data to the tone correction section 112.

The tone correction section 112 performs the tone correction of the per-pixel CMYK color-tone data inputted from the color conversion section 111. Specifically, the tone correction section 112 refers to the look-up table 115 previously stored in the non-volatile memory and then, corrects the per-pixel CMYK color-tone data, inputted from the color conversion section 111, based on the look-up table 115. Thus, the tone correction section 111 provides corrected CMYK color-tone data representing corrected tone levels. The tone correction is directed to compensating for the varied gamma characteristics of the engine EG of the above arrangement, thereby ensuring that the overall gamma characteristics of the image forming apparatus are constantly maintained at ideal levels.

The CMYK color-tone data thus corrected are inputted to the halftoning section 113. The halftoning section 113 performs a halftoning process, such as error diffusion, dithering or screening, for supplying the pulse modulation section 114 with halftoned CMYK color-tone data comprising 8 bits per color component for each pixel.

The halftoned CMYK color-tone data inputted to the pulse modulation section 114 indicates a size of each dot of toners of the CMYK colors to be made adhere to each pixel. Based on such halftoned CMYK color-tone data thus received, the pulse modulation section 114 generates a video signal for pulse width modulation of an exposure laser pulse for each of CMYK color images which is emitted from the engine EG and then, outputs the resultant signal to the engine controller 12 via a video interface not shown. In response to the video signal, the laser driver 121 performs ON/OFF control of a semiconductor laser of the exposure unit 8 whereby an electrostatic latent image of each color component is formed on the photosensitive member 21. Normal printing is performed in this manner (normal print mode).

In addition to the normal print mode, the image forming apparatus has a tone correction mode which is performed at a proper time following the activation of the apparatus, for example, to form a gradation patch image for tone correction and re-define the look-up table. The tone correction mode takes the following procedure to update the look-up table for each of the toner colors: 1. The engine EG is operated to form a predetermined gradation patch image for tone correction on the intermediate transfer belt 41 in order to determine the gamma characteristics; 2. The patch sensor PS is operated to detect a toner image density of each of the patch portions of the gradation patch image; 3. Based on signals from the patch sensor PS, the tone-characteristic detection section 123 generates a tone characteristic curve (gamma characteristics of the engine EG) representing the detected toner image densities in correspondence with the tone levels of the patch portions and then, outputs the resultant characteristic curve to the look-up table operation section 116 of the main controller 11.

According to the embodiment, data on the gradation patch image are stored, for example, in the ROM of the main controller 11 so that the aforementioned image forming operations are performed based on the image data thereby forming the gradation patch image of the predetermined pattern on the surface of the intermediate transfer belt 41.

Figure 3A:
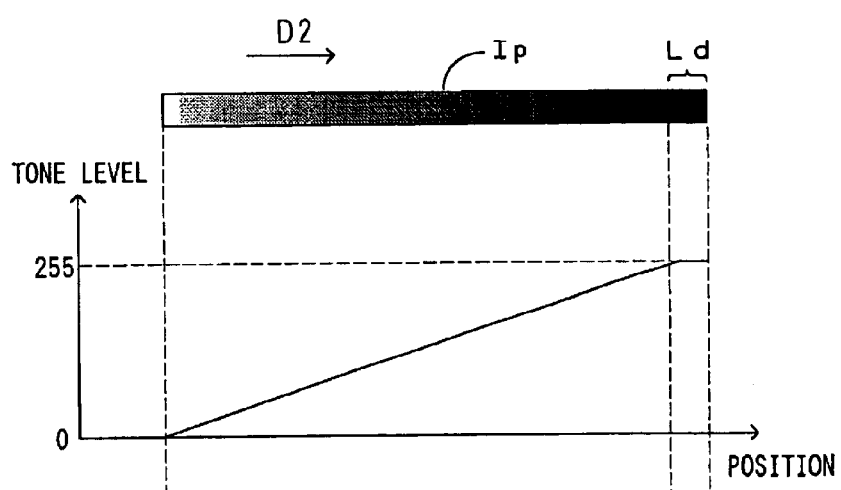
FIGS. 3A and 3B are a group of graphs each representing a gradation patch image.
Figure 3B:
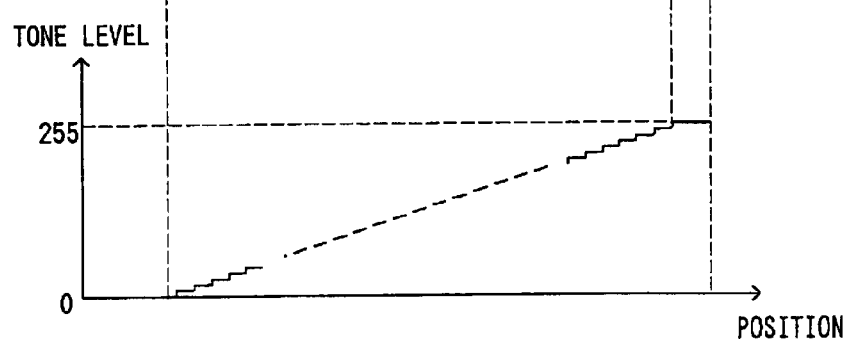

FIGS. 3A and 3B show the gradation patch image. As seen in FIG. 3A, a gradation patch image Ip according to the embodiment extends in a strip along a moving direction D2 of the intermediate transfer belt 41. The gradation patch image is formed in varied tone levels or in tone levels progressively increased from the minimum level (level 0) to the maximum level (level 25) along the moving direction D2. The variations of the tone level may be either in a continuous and consistent fashion as shown in FIG. 3A or in a stepwise fashion as shown in FIG. 3B. According to the embodiment, the direction along the moving direction D2 of the intermediate transfer belt 41 is defined to mean "the predetermined direction" of the invention.

The gradation patch image Ip thus formed is determined for the toner image densities thereof by means of the patch sensor PS. The patch sensor PS is comprised of a reflective photosensor, for example, which emits light toward the surface of the intermediate transfer belt 41 and receives light reflected from a predetermined detection region of the irradiated area so as to detect the quantity of the received light. Since the quantity of the reflected light varies according to the amount of toner adhered to the intermediate transfer belt 41, the toner image density can be determined from the detected quantity of the received light. According to the embodiment, the patch sensor PS functions as "density detection means" of the invention.

Figure 4:
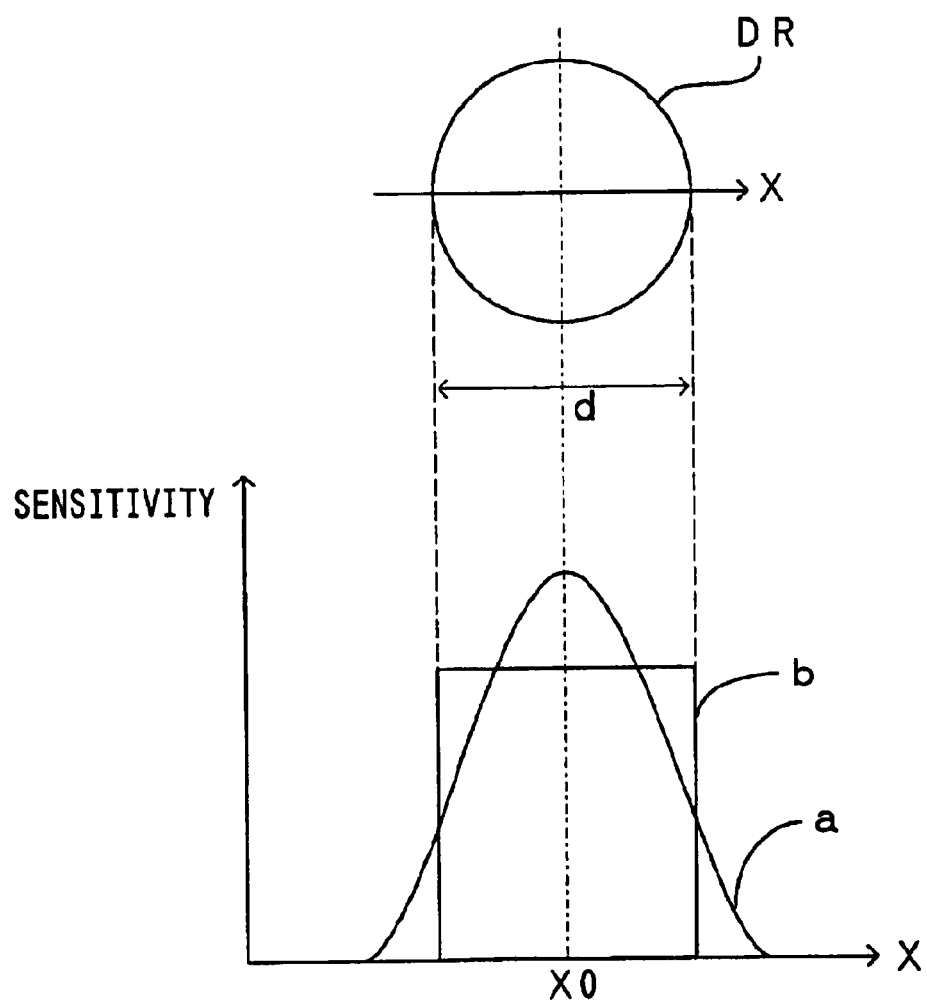
FIG. 4 is a graph with diagram for illustrating an example of a detection region of a patch sensor.

FIG. 4 illustrates an example of the detection region of the patch sensor. The patch sensor PS receives light reflected from each of points in a detection region DR in the surface of the intermediate transfer belt 41 and outputs a voltage corresponding to a quantity of the received light. Although the shape of the detection region DR depends upon the structure of the patch sensor PS, the description herein is made by way of example of a circular detection region having a diameter d, as shown in FIG. 4. Besides the circular shape, the detection region may also have an elongated circular shape or a rectangular shape. For higher detection accuracies, however, the detection region may preferably be symmetrical with respect to its axis (X=X0) as shown in FIG. 4.

In general, the sensitivity of the patch sensor in the detection region DR is progressively increased toward the center of the detection region but progressively decreased toward the circumference thereof, as represented by a Gaussian curve 'a' shown in FIG. 4 for example. For easy comprehension, however, the description is made on assumption that the patch sensor PS has a constant sensitivity in the detection region DR as represented by a line 'b' in the figure. A case where the sensitivity of the patch sensor is varied will be discussed hereinlater.

Figure 5:
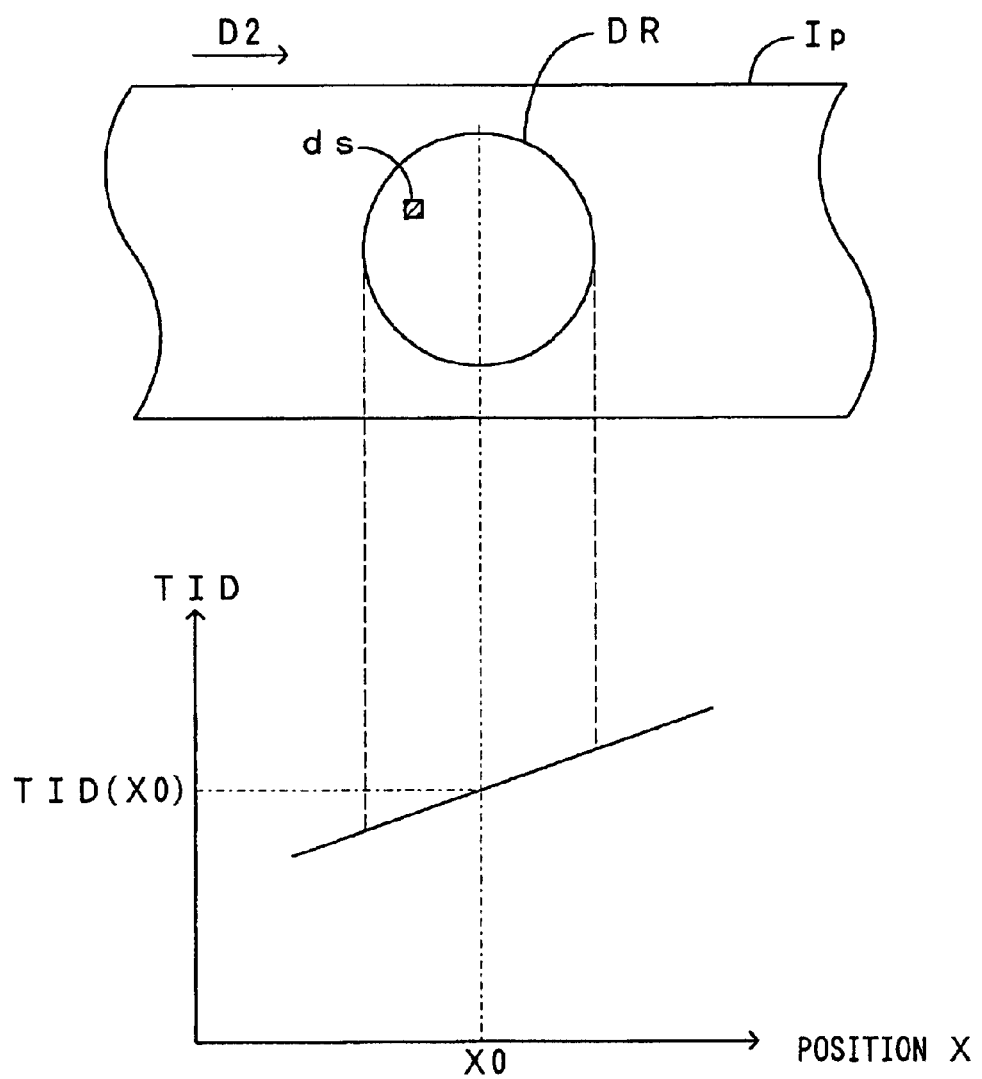
FIG. 5 is a graph with diagram for explaining density detection principles for the gradation patch image continuously varied in the tone level thereof.
Figure 6:
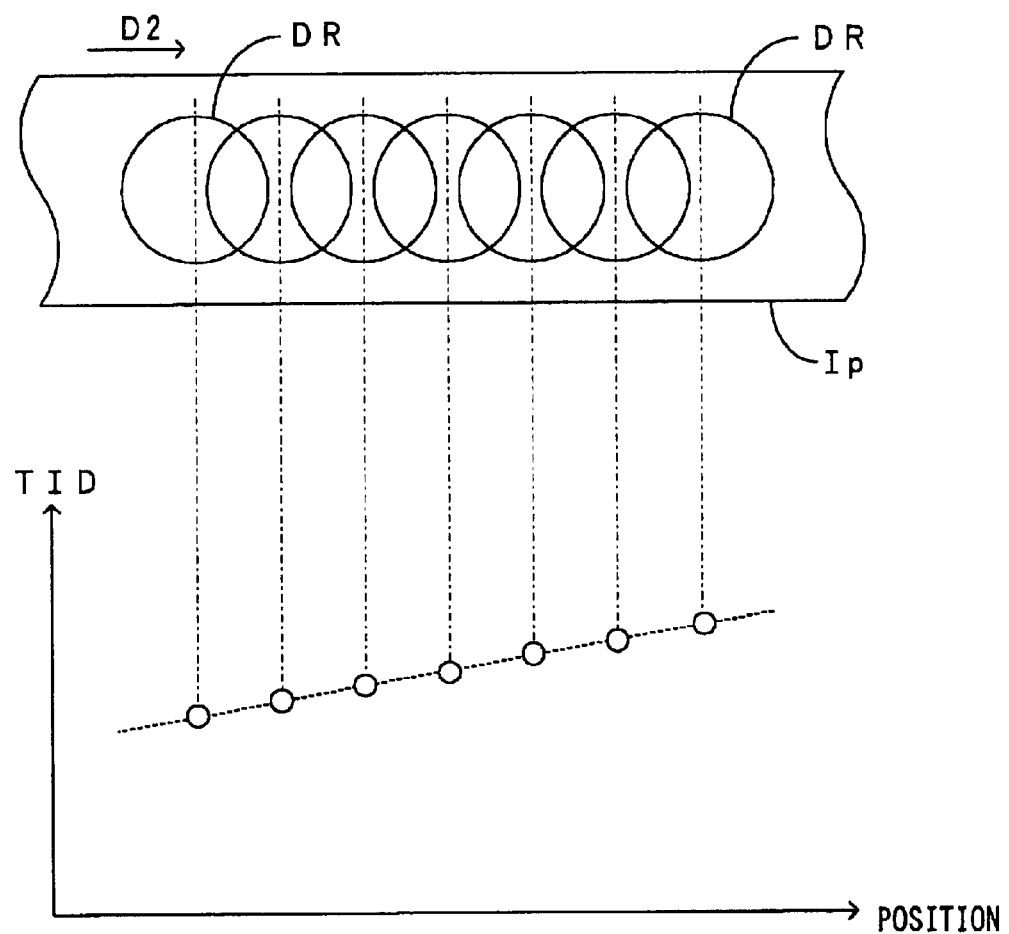
FIG. 6 is a graph with diagram for illustrating a plurality of detection regions.

First, a tone correction process using the gradation patch image continuously varied in the tone level, as shown in FIG. 3A, is described with reference to FIGS. 5 and 6. FIG. 5 illustrates the principles of density detection of the gradation patch image with continuously varied gradation levels. FIG. 6 illustrates a plurality of detection regions. The gradation patch image Ip has a gradation with the tone levels continuously varied along the moving direction D2 of the intermediate transfer belt 41, so that the toner image densities TID thereof are varied depending upon positions X with respect to the moving direction D2.

The quantity of light received by the patch sensor PS is given by integrating light quantities emitted from micro-area elements 'ds' in the detection region DR with respect to the detection region DR. The toner image density of the gradation patch image Ip in the detection region DR, as determined from the resultant integration value, represents an average toner image density in the detection region DR. That is, the patch sensor PS is incapable of recognizing the density variations on a smaller basis than the size of the detection region DR. In this sense, the size of the detection region DR is effectively equivalent to the resolution of the patch sensor PS.

As described in the foregoing, the gradation patch image Ip in the detection region DR is varied in the toner image density in a continuous and consistent manner. Accordingly, the toner image density in the detection region DR is progressively decreased from the center (X=X0) toward an upstream side (the left side as seen in FIG. 5) with respect to the direction D2, but is progressively increased toward a downstream side (the right side as seen in FIG. 5). Hence, the average toner image density of the detection region DR is substantially equal to a toner image density TID(X0) of the gradation patch image Ip as determined at the center (X=X0) of the detection region DR with respect to the direction D2. This is because a density difference between the center and a higher density portion (the right-side portion as seen in FIG. 5) is compensated with a density difference between the center and a lower density portion (the left-side portion as seen in FIG. 5). Despite the varied tone levels in the detection region DR, the toner image density thus determined represents the image density at a single tone level in correspondence to the center position X=X0.

The conventional image forming apparatus requires the formation of a patch image having a larger size than the detection region DR and a single tone level in order to determine the toner image density at one tone level. The determination of image densities at multiple tone levels requires a plural number of such patch images, resulting in the increased toner consumption and process time. In a conventional technique for obviating the above problem, the tone characteristics are estimated from the image densities of several typical patch images at discrete tone levels. However, the technique uses measurements of only a limited number of samples so that exact variations of the image densities between samples cannot be detected. Thus, the conventional technique falls short of achieving the correction with sufficient accuracy.

On the other hand, in the case of an image forming apparatus having a high-resolution sensor to generate image signal corresponding to the original image as a copier or an apparatus with image scanner, the sensor can be used as the patch sensor.

For example, an image forming apparatus disclosed in Japanese Patent Application Laid-Open Gazette No. H6-311365 executes the following tone correction process. The process consists of: formation of a test pattern having a gradation onto a recording paper; detection of the density of the test pattern by a CCD line-sensor disposed to scan a document set on the table; and tone correction of the apparatus based on the result of the detection.

However, the tone correction of the apparatus essentially needs the operation by the user to set the recording paper onto the document table and to press a button to start scanning. Therefore, it is far different from the image forming apparatus and method according to the present invention which uses the patch sensor PS and executes whole operation internally, as described later.

Further, from the content of the above-mentioned gazette, it is assumed that the density of the test pattern within view range of each element of CCD line sensor is constant. That is, there is neither description nor suggestion about how the apparatus can determine the density of the test pattern when the test pattern has a gradation with smaller pitch of the tone change than the resolution of the sensor. Therefore, it lacks awareness of the problem to resolve of the conventional tone correction technique described before. In the point that it needs uniformity of density of the test pattern within the resolution of the sensor, it is should be said that the apparatus in the gazette is substantially same as the conventional tone correction technique.

In contrast, in the apparatus in the embodiment, use of the aforementioned gradation patch image Ip continuously and consistently varied in the tone level provides for a high-accuracy determination of the toner image density at any one of the tone levels, negating the need for forming large patch in ages at the respective tone levels.

Furthermore, the gradation patch image Ip with the continuously and consistently varied tone levels permits the detection region DR to be defined anywhere in the gradation patch image and also permits the patch sensor PS to give a detection result representing a toner image density at a tone level corresponding to the center of the defined detection region DR. This leads to an ability to determine the toner image density at an arbitrary tone level by performing the density detection based on the detection region defined at a proper place in such a gradation patch image Ip. Thus, the toner image density detection may be repeated over a required number of cycles as shifting the detection region DR in a single gradation patch image Ip, whereby measurement values for the tone characteristics of the engine EG can be obtained from an arbitrary number of samples.

The apparatus of the embodiment provides the greatest possible number of samples for more exact tone correction affording a more smooth tone characteristic curve. As shown in FIG. 6, the density detection is performed on plural positions in the gradation patch image Ip, which are shifted along the conveying direction D2 of the intermediate transfer belt 41 and are individually corresponded by respective detection regions DR partially overlapping their neighboring regions. Such an arrangement permits the apparatus to accomplish an exact detection of the density variations in the gradation patch image Ip in correspondence to the tone levels, obviating any undetected density variation. Hence, even higher accuracy can be achieved by the tone correction based on the tone characteristics thus determined.

In the apparatus, the gradation patch image Ip is moved directly under the patch sensor PS in conjunction with the rotational movement of the intermediate transfer belt 41. In synchronism with the passage of each patch portion of the gradation patch image, the tone-characteristic detection section 123 samples an output from the patch sensor PS for density detection. Therefore, a required number of sample data items can be obtained at a predetermined pitch by defining a proper sampling cycle according to the moving speed of the intermediate transfer belt 41.

Figure 7:
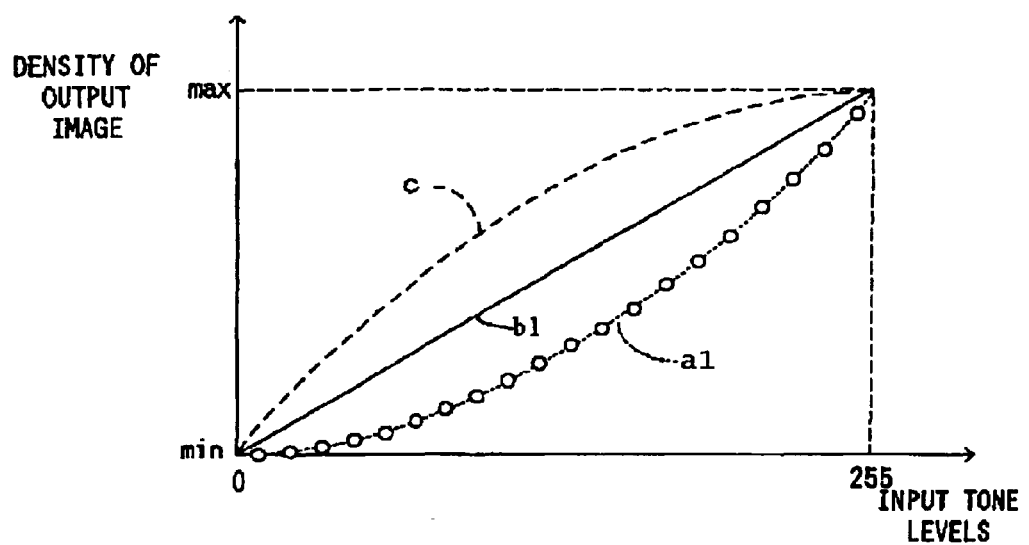
FIG. 7 is a graph which shows a tone characteristic curve of a print engine and a correction characteristic curve therefor.

FIG. 7 graphically illustrates a tone characteristic curve and a corrected tone characteristic curve of the engine EG. The toner image densities thus detected at the respective points in the gradation patch image Ip are plotted in correspondence to the respective tone levels thereof whereby a curve representing the tone characteristics of the apparatus is obtained, as indicated by a curve 'a1' in FIG. 7 for example. In some cases, the resultant gradation characteristic curve based on the measurement values may not coincide with an ideal tone characteristic curve or an essentially desirable curve (exemplified by a curve 'b1' in FIG. 7) as a result of characteristic differences among individual apparatuses, aging, or environmental changes. As a solution to this problem, the image signal is previously subjected to tone correction based on inverse tone characteristics to the above measured tone characteristics so that an image faithfully reproducing the tone characteristics of the input image signal may be formed.

Specifically, the look-up table operation section 116 performs calculation based on the tone characteristics supplied from the tone-characteristic detection section 123, thereby generating look-up table data for obtaining the ideal tone characteristics through compensation for the measured tone characteristics of the engine EG. Subsequently, the look-up table operation section 116 updates the content of the look-up table 115 based on the resultant data. In this manner, the look-up table is re-defined (tone correction mode).

In the subsequent image forming operations, the per-pixel CMYK color-tone data inputted from the color conversion section 111 are corrected with reference to the look-up table 115 thus updated and then, a high-quality image of excellent tone characteristics is formed based on the corrected CMYK color-tone data. Furthermore, the look-up table updated on an as-required basis permits an ideal tone correction to be carried out at any time in correspondence to the time-varying gamma characteristics. This ensures that an image of a consistent image quality is formed.

Figure 8:
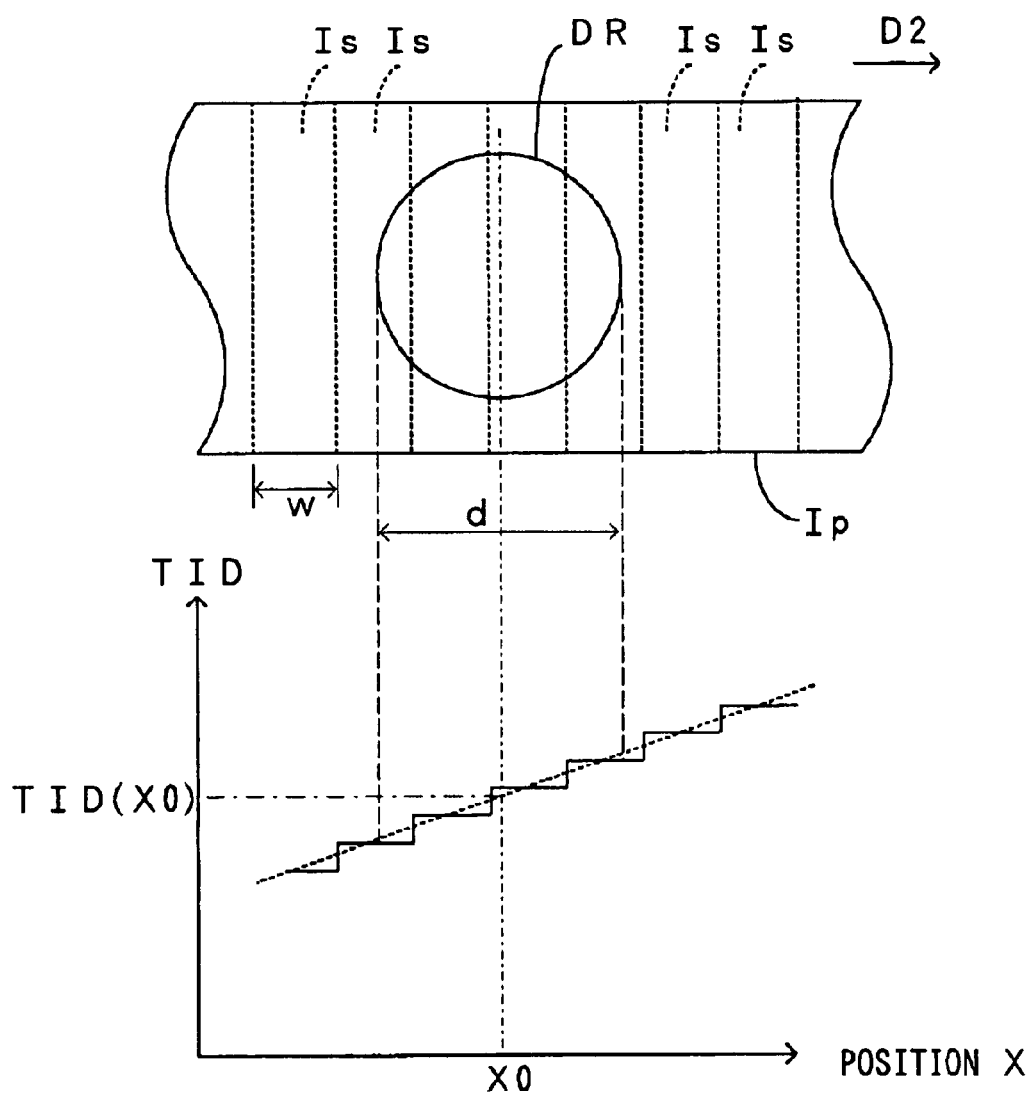
FIG. 8 is a graph with diagram for explaining density detection principles for the gradation patch image varied stepwise in the tone level thereof.

Next, a tone correction process using a gradation patch image varied stepwise in the tone level, as shown in FIG. 3B, is described with reference to FIG. 8. FIG. 8 illustrates the principles of density detection of the gradation patch image varied stepwise in the tone level. In this case, the gradation patch image Ip may be regarded as an entity consisting of, as shown in FIG. 8, a plurality of monotone toner images Is having different tone levels (or different toner image densities) from one another and continuously arranged along the moving direction D2 of the intermediate transfer belt 41. A width 'w' of each monotone toner image Is with respect to the direction D2 is smaller than a width 'd' of the detection region DR, so that two or more monotone toner images of different tone levels always appear in the detection region DR of the patch sensor PS. FIG. 8 shows an example where 4 monotone toner images of different tone levels appear in the detection region DR.

A tone level difference between adjoining monotone toner images is the minimum practicable level difference for the apparatus or in other words, one of the 256 tone levels. That is, this gradation patch image Ip consists of 256 monotone toner images Is varied in the tone level from the minimum level 0 to the maximum level 256 in 1-level steps. The gradation patch image thus formed can cover the overall range of tone levels.

The tone level difference between adjoining monotone toner images may not be the minimum level difference (1 tone level) but may be a greater level difference (in steps of 2 levels or 4 levels, for instance). This approach reduces the length of the gradation patch image Ip with respect to the direction D2, contributing to the reduction of the toner consumption and process time. However, it is more preferred to adopt the smallest possible level difference in the light of more exact determination of the tone characteristics of the engine EG. As will be described hereinlater, the gradation patch image Ip may preferably arranged such that the monotone toner images Is each have an equal width 'w' and a constant tone level difference from a respective adjacent monotone toner image thereto.

When the patch sensor PS performs the density detection on the gradation patch image Ip thus arranged, a toner image density TID in a detection region DR is a weighted average of the densities of the individual monotone toner images Is weighted according to their areas in the detection region DR. In addition, the tone levels are progressively increased along the direction D2 and hence, toner image densities at portions on either sides with respect to the direction D2 are compensated with each other by averaging. As a result, an average toner image density of the gradation patch image Ip in the detection region DR substantially represents a toner image density TID(X0) at the center (X=X0) of the detection region.

As described above, the toner image densities of the individual monotone toner images are weight-averaged so that the average density thereof takes not only a discrete value corresponding to the toner image densities of the individual monotone toner images but also an intermediate value of the toner image densities thereof. That is, the gradation patch image Ip with the tone levels varied stepwise at a smaller pitch than the width of the detection region DR may be used to permit a detection region DR to be defined at an arbitrary position in the gradation patch image Ip for determination of a patch image density at a tone level corresponding to that of the center of the defined detection region DR as if the gradation patch image continuously varied in the tone level were used.

From the standpoint of the patch sensor PS, such microscopic stepwise tone variations in the gradation patch image Ip can substantially be regarded as the continuous, consistent tone variations. When the toner image densities TID of all the detection regions DR are determined, the tone correction may be performed the same way as in the foregoing example.

It is noted that the foregoing description has been made on assumption that the patch sensor PS has a consistent detection sensitivity for the detection region DR. In the actual apparatus, however, the detection sensitivity of the sensor is generally the highest at the center of the detection region DR and progressively decreased toward the circumference of the region, as shown in FIG. 4. In actual fact, therefore, a toner image density at the circumference of the detection region DR is less reflected in the detection results whereas a toner image density at the center thereof is significantly reflected in the detection results. In other words, the patch sensor PS is decreased in the sensitivity for the circumference of the detection region DR and hence, the toner image density at the circumference of the region intrinsically has an insignificant influence on the detection results. Furthermore, an increased toner image density and a decreased toner image density at portions on either sides with respect to the center of the detection region compensate with each other. Therefore, the toner image density of the center portion of the detection region DR in the gradation patch image Ip can exclusively be detected with high accuracy by performing the density detection in the aforementioned manner.

Particularly, if a density variation curve is symmetrical with respect to the center of the detection region DR, or if the toner image density on one side is increased at the same rate as the toner image density on the other side is decreased, the increase in the toner image density and the decrease in the toner image density at portions on either sides with respect to the center of the detection region substantially cancel each other out. Accordingly, the patch sensor PS gives the detection result substantially in coincidence with the toner image density at the center of the detection region. This leads to the ability to determine the tone characteristics with even higher accuracy. The embodiment accomplishes the aforesaid symmetrical characteristic by employing, as the gradation patch image Ip, the toner image continuously and consistently varied in the tone level or the toner image comprising a continuous array of monotone toner images Is having a constant tone level difference from each adjoining monotone toner image Is and a constant width 'w'.

Consider now aligning precision between a position of the gradation patch image Ip formed on the intermediate transfer belt 41 and a detection position of the patch sensor PS. The conventional tone correction technique is based on the assumption that the patch image is so formed as to have a consistent tone level in the detection region of the patch sensor. In a case where the patch image is displaced from the detection position so that the detection region partially overlaps a toner image portion of a different tone level or an area free from the toner image portion, the detection results sustains serious errors. In order to avoid this, each patch image of one tone level must be formed in a larger size than the detection region.

In the gradation patch image Ip of the embodiment, on the other hand, a displacement of the gradation patch image with respect to the moving direction D2 of the intermediate transfer belt 41 appears as a shifted position X as shown in FIG. 5. This merely results in a somewhat shift of a tone level in correspondence to the shifted position X and hence, the detection results does not encounter the serious errors suffered by the conventional technique. In addition, such a shifted detection position can be corrected by calculation. That is, even though the whole gradation patch image Ip is formed at a displaced position, there occurs no relative change in the relation between the individual positions in the gradation patch image and their corresponding tone levels. Therefore, if a reference position in the gradation patch image Ip can be detected in some way, each exact tone level for its corresponding position can be calculated based on a relative positional relation between the position and the reference position.

In an exemplary approach, the embodiment corrects the aforesaid displacement as follows. First, as shown in FIGS. 3A and 3B, a gradation patch image Ip is formed in a manner that the tone level is progressively increased toward the downstream side (the right side as seen in FIG. 3) with respect to the moving direction D2 of the intermediate transfer belt 41. Thus, the gradation patch image Ip on the intermediate transfer belt 41 is carried with its end of the highest toner image density positioned at a leading end. Where the output from the patch sensor PS is sampled at regular intervals, the sensor output varies greatly at the point of time that the leading end of the gradation patch image Ip on the belt reaches the detection region DR of the patch sensor PS. The control unit 1 recognizes this output change as the arrival of the leading end of the gradation patch image Ip at the detection region DR. Thus, the position associated with this output change is regarded as the leading end of the gradation patch image Ip and a relative position in the gradation patch image Ip is determined by calculation using a sample count taken from the arrival of the leading end. Then, the tone characteristics of the apparatus are determined based on the tone levels corresponding to the detection positions and the detection results of the toner image densities at the detection positions.

According to the embodiment, as shown in FIG. 3A, a leader portion Ld presenting the maximum tone level (level 255) over a predetermined length is provided at the leading end of the gradation patch image Ip for ensuring the detection of the leading end of the gradation patch image Ip. The length of the leading portion Ld may preferably be at least greater than the width 'd' of the detection region DR of the patch sensor PS.

On the other hand, a problem associated with displacement of the gradation patch image Ip from the detection region DR of the patch sensor PS with respect a direction orthogonal to the moving direction D2 of the intermediate transfer belt 41 may be solved by forming the gradation patch image Ip in a somewhat greater width than that of the detection region DR with respect to the above direction. Needless to say, a measure taking such a displacement into consideration is unnecessary in a case where adequate aligning precision can be achieved by setting a start timing of forming the gradation patch image Ip and a start timing of sampling the gradation patch image Ip based on a predetermined reference signal (such as a vertical synchronizing signal outputted in synchronism with each revolution of the intermediate transfer belt 41).

As described above, the image forming apparatus is adapted to form the gradation patch image Ip and to re-define the look-up table 115 based on the toner image densities of the gradation patch image. Therefore, the apparatus is capable of forming an image while maintaining favorable tone characteristics by compensating for the changes in the gamma characteristics of the engine EG due to the environmental changes such as of temperature and humidity or to other changes over time.

The gradation patch image Ip is formed in a manner that the tone levels thereof are continuously varied or varied stepwise at a smaller pitch than the width 'd' of the detection region DR of the patch sensor PS. Therefore, the density variations at portions on either sides in the detection region DR cancel each other out so that only the toner image density at the center of the region can be detected. This leads loan equivalent effect to that attained by increasing the resolution of the patch sensor PS. Hence, the gradation patch image for density detection at a required number of tone levels may be reduced in the area thereof, resulting in a notable reduction of the toner consumption and process time.

Further, the gradation patch image Ip is consistently varied in the tone level so that the density difference between the portions on either sides in the detection region DR is canceled out and hence, the toner image density at the center of the region can be determined with high accuracy.

Furthermore, the tone characteristics of the apparatus can be determined from an arbitrary number of samples by performing the density detection at a required number of positions on the gradation patch image Ip. Therefore, a more smooth tone characteristics may be obtained by increasing the number of samples on an as-required basis. Thus, a more exact tone correction can be accomplished based on the resultant tone characteristics.

It is noted that the invention is not limited by the foregoing embodiments and other various changes and modifications may be made thereto within the scope of the invention. For instance, the foregoing embodiments apply the invention to the image forming apparatus such as a printer which is designed to produce a printed image corresponding to an image signal received from the host computer 100. As a matter of course, the invention is also applicable to a copier which optically reads an original image and then produces a printed image corresponding to the read original image. Furthermore, the invention is also applicable to a tandem type image forming system.

The foregoing embodiment is arranged such that the patch sensor PS is disposed in face-to-face relation with the intermediate transfer belt 41 for detection of the density of the toner image carried on the intermediate transfer belt 41 serving as the image carrier. An alternative arrangement is also possible wherein, for example, the patch sensor PS is disposed in face-to-face relation with the photosensitive member 21 for detection of the density of the toner image formed on the photosensitive member 21.

In the foregoing embodiment, the patch image data for tone correction are stored in, for example, the ROM of the main controller 11. However, the data may be stored in the ROM of the engine controller 12, for example, or otherwise be sent from the host computer. In the case of a copier or the like, a user may set an original of the patch image for tone correction.

According to the foregoing embodiment, the gradation patch image Ip has the highest tone level at the leading end thereof such that the position of the leading end may be detected based on the change in the sensor output. However, the detection method is not limited to this. For instance, a separate toner image as a position detection marker may be formed in the vicinity of the gradation patch image or the leading end has the lowest tone level.

The foregoing embodiments employ, as the gradation patch image Ip, either the toner image continuously and consistently varied in the tone level or the continuous array of monotone toner images Is having a constant tone level difference from each adjoining monotone toner image Is and a constant width 'w', in order that the tone levels in the gradation patch image Ip may vary symmetrically with respect to the center of the detection region DR. While it is preferred that the symmetrical characteristic is established at least in each detection region DR, the symmetrical characteristic need not be established in the overall gradation patch image Ip. Thus, the gradation patch image Ip does not necessarily have the tone levels thereof consistently varied over the whole area thereof. In order to increase the reliability of the detection on the low density side more susceptible to the influence of the intermediate transfer belt surface 41 to which a smaller amount of toner adheres, for example, the area of lower tone levels (the left-hand area as seen in FIG. 3A) may be varied in the tone level at a smaller rate than the area of higher tone levels (the right-hand area as seen in FIG. 3A), as need dictates.

Furthermore, according to the foregoing embodiment, the gradation patch image Ip comprises a single toner image wherein the tone levels are continuously varied from the maximum level (level 255) to the minimum level (level 0). As required, however, the gradation patch image may comprise a plurality of toner images having the tone levels varied depending upon the positions. In this case, the rate of tone level variation may vary from toner image to toner image.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus comprising:
   an image carrier constructed to bear a toner image thereon; and
   density detection means constructed to detect a density of an image in a predetermined detection region on said image carrier and operative to detect a toner image density of the toner image borne on said image carrier,
   wherein a toner image having tone levels progressively increased or decreased along a predetermined direction is formed as a gradation patch image which is subjected to density detection by said density detection means, and tone correction information is defined based on the detection results and then used for tone correction of an input image signal thereby to obtain a tone-corrected image signal, based on which an image is formed, and
   wherein said gradation patch image has the tone levels thereof increased or decreased stepwise at a smaller pitch than a width of said detection region with respect to said predetermined direction.

2. An image forming apparatus according to claim 1, wherein said gradation patch image comprises a plurality of monotone toner images differing from one another in the tone levels and continuously arranged along said predetermined direction, and wherein said monotone toner image has a smaller width than that of said detection region with respect to said predetermined direction.

3. An image forming apparatus according to claim 2, wherein said plural monotone toner images each has the same width with respect to said predetermined direction and has a constant tone level difference from a respective adjacent monotone toner image thereto.

4. An image forming apparatus according to claim 3, wherein the difference of tone level between any pair of adjoining ones of said plural monotone toner images is the minimum practicable level difference for the apparatus.

5. An image forming apparatus according to claim 1, wherein said density detection means performs the density detection on a plurality of positions in said gradation patch image, the positions shifted from each other along said predetermined direction.

6. An image forming apparatus according to claim 5, wherein said detection regions individually corresponding to any pair of adjoining ones of the plural positions have at least a respective part thereof in contacting relation or in overlapping relation.

7. An image forming apparatus according to claim 1, wherein the maximum tone level of said gradation patch image is the maximum practicable tone level for the apparatus whereas the minimum tone level of said gradation patch image is the minimum practicable tone level for the apparatus.

8. An image forming apparatus according to claim 1, wherein the detection result at said detection region is treated as a value indicative of the density of the center of said detection region.

9. An image forming apparatus according to claim 1, wherein a leader image portion which has a maximum tone level is provided at a high tone level end of said gradation patch image.

10. An image forming apparatus comprising:

an image carrier constructed to bear a toner image thereon; and density detection means constructed to detect a density of an image, in a predetermined detection region having a shape symmetrical with respect to a predetermined axis, on said image carrier and operative to detect a toner image density of the toner image borne on said image carrier, wherein a toner image having tone levels monotonously and continuously increased or decreased along a predetermined direction perpendicular to said predetermined axis is formed as a gradation patch image which is subjected to density detection by said density detection means, and tone correction information is defined based on the detection results and then used for tone correction of an input image signal thereby to obtain a tone-corrected image signal, based on which an image is formed.

11. An image forming apparatus according to claim 10, wherein said gradation patch image is monotonously and consistently increased or decreased in the tone level along said predetermined direction.

12. An image forming apparatus according to claim 10, wherein the detection result at said detection region is treated as a value indicative of the density of the center of said detection region.

13. An image forming apparatus according to claim 10, wherein a leader image portion which has a maximum tone level is provided at a high tone level end of said gradation patch image.

14. An image forming method for forming an image based on a tone-corrected image signal obtained by tone-correcting an input image signal based on tone correction information, comprising:

forming a gradation patch image progressively increased or decreased in the tone level along a predetermined direction;

detecting a density of a detection region having a shape symmetrical with respect to an axis perpendicular to said predetermined direction on said gradation patch image by a density detection means; and defining said tone correction information based on the detection results:

wherein said gradation patch image comprises either an image monotonously and continuously increased or decreased in the tone level along said predetermined direction or an image having the tone levels increased or decreased stepwise along said predetermined direction and at a smaller pitch than a width of a detection region of said density detection means.

* * * * *